United States Patent
Furuichi et al.

(10) Patent No.: US 11,018,338 B2
(45) Date of Patent: May 25, 2021

(54) POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

(71) Applicant: SUMITOMO METAL MINING CO., LTD., Tokyo (JP)

(72) Inventors: Yuki Furuichi, Niihama (JP); Jun Suzuki, Niihama (JP); Tetsufumi Komukai, Niihama (JP)

(73) Assignee: Sumitomo Metal Mining Co., Ltd.

( * ) Notice: Subject to any disclaimer, the term of this patent is extended or adjusted under 35 U.S.C. 154(b) by 40 days.

(21) Appl. No.: 15/748,338

(22) PCT Filed: Jun. 21, 2016

(86) PCT No.: PCT/JP2016/068418
§ 371 (c)(1),
(2) Date: Jan. 29, 2018

(87) PCT Pub. No.: WO2017/018099
PCT Pub. Date: Feb. 2, 2017

(65) Prior Publication Data
US 2018/0226646 A1 Aug. 9, 2018

(30) Foreign Application Priority Data

Jul. 30, 2015 (JP) .............................. JP2015-151228

(51) Int. Cl.
*H01M 4/525* (2010.01)
*H01M 4/505* (2010.01)
(Continued)

(52) U.S. Cl.
CPC ............. *H01M 4/525* (2013.01); *C01G 53/50* (2013.01); *H01M 4/36* (2013.01); *H01M 4/366* (2013.01);
(Continued)

(58) Field of Classification Search
CPC .. C01G 53/50; C01P 2004/50; C01P 2004/62; C01P 2004/64; C01P 2004/80;
(Continued)

(56) References Cited

U.S. PATENT DOCUMENTS

2014/0087263 A1* 3/2014 Matsumoto .......... C01G 53/006
429/223
2017/0084916 A1   3/2017 Oka et al.
2017/0141391 A1* 5/2017 Jito ....................... H01M 4/362

FOREIGN PATENT DOCUMENTS

JP   2005-251716   9/2005
JP   2010-40383    2/2010
(Continued)

OTHER PUBLICATIONS

Scientific and Technical Information Center (STIC) search results by Scott Seagal (Year: 2019).*
International Search Report dated Sep. 27, 2016.

*Primary Examiner* — Victoria H Lynch
(74) *Attorney, Agent, or Firm* — Gerald E. Hespos; Michael J. Porco; Matthew T. Hespos

(57) ABSTRACT

Provided is a positive electrode active material for nonaqueous electrolyte secondary batteries that is represented by the general formula (1): $Li_aNi_{1-x-y}Co_xM_yW_zO_{2+\alpha}$ (where $0 \le x \le 0.35$, $0 \le y \le 0.35$, $0.0008 \le z \le 0.030$, $0.97 \le a \le 1.25$, and $0 \le \alpha \le 0.20$, and M is at least one element selected from Mn, V, Mg, Mo, Nb, Ti, and Al) and is constituted by a Li-metal composite oxide composed of primary particles and secondary particles formed by aggregation of the primary particles, wherein a compound including Li and W is formed on the
(Continued)

surface of the primary particles of the composite oxide and the amount of W contained in the compound is such that the number of atoms of W is 0.08 to 0.30 at % with respect to the total number of atoms of Ni, Co, and M contained in the positive electrode active material.

7 Claims, 3 Drawing Sheets

(51) Int. Cl.
| | |
|---|---|
| *H01M 4/36* | (2006.01) |
| *H01M 4/62* | (2006.01) |
| *C01G 53/00* | (2006.01) |
| *H01M 10/0525* | (2010.01) |
| *H01M 4/02* | (2006.01) |

(52) U.S. Cl.
CPC ............ *H01M 4/505* (2013.01); *H01M 4/62* (2013.01); *H01M 10/0525* (2013.01); *C01P 2004/50* (2013.01); *C01P 2004/62* (2013.01); *C01P 2004/64* (2013.01); *C01P 2004/80* (2013.01); *C01P 2006/12* (2013.01); *C01P 2006/40* (2013.01); *H01M 2004/021* (2013.01); *H01M 2004/028* (2013.01)

(58) Field of Classification Search
CPC ............ C01P 2006/12; C01P 2006/40; H01M 10/0525; H01M 2004/021; H01M 2004/028; H01M 4/36; H01M 4/366; H01M 4/505; H01M 4/525; H01M 4/62
See application file for complete search history.

(56) References Cited

FOREIGN PATENT DOCUMENTS

| | | |
|---|---|---|
| JP | 2013-125732 | 6/2013 |
| JP | 2013-137947 | 7/2013 |
| JP | 2013-152866 | 8/2013 |
| JP | 2016-127004 | 7/2016 |
| WO | 2015/141179 | 9/2015 |

* cited by examiner

POSITIVE ELECTRODE ACTIVE MATERIAL FOR NONAQUEOUS ELECTROLYTE SECONDARY BATTERY, AND NONAQUEOUS ELECTROLYTE SECONDARY BATTERY

BACKGROUND

Field of the Invention

The present invention relates to a positive electrode active material for nonaqueous electrolyte secondary batteries, and a nonaqueous electrolyte secondary battery made using the positive electrode active material.

Description of the Related Art

In recent years, with the wide adoption of portable electronic devices such as mobile phones and laptop computers, the development of small and lightweight nonaqueous electrolyte secondary batteries having high energy density is strongly desired. Further, the development of high power secondary batteries as batteries for electric cars including hybrid cars is strongly desired.

As secondary batteries satisfying such demands, lithium ion secondary batteries have been proposed; such lithium ion secondary batteries are composed of a negative electrode, a positive electrode, an electrolyte, etc., and materials capable of intercalation and deintercalation of lithium ions are used for the active materials of the negative electrode and the positive electrode.

The lithium ion secondary batteries are now being actively studied and developed. Above all, lithium ion secondary batteries using a layered or spinel lithium-metal composite oxide as a positive electrode material allow a high voltage of 4-V class to be obtained, and therefore are being put into practical use as batteries having high energy density.

Main examples of materials proposed so far include lithium cobalt composite oxide ($LiCoO_2$) that is comparatively easily synthesized, lithium nickel composite oxide ($LiNiO_2$) using nickel that is less expensive than cobalt, lithium nickel cobalt manganese composite oxide ($LiNi_{1/3}Co_{1/3}Mn_{1/3}O_2$), and lithium manganese composite oxide ($LiMn_2O_4$) using manganese.

Among these, lithium-nickel composite oxide and lithium nickel cobalt manganese composite oxide are gaining attention as a material having good cycle characteristics and low resistance and allowing high power to be obtained, where the resistance reduction that is necessary for power enhancement has been regarded as being important in recent years.

As a method for achieving the resistance reduction, addition of different elements is used, and transition metals capable of having high valence such as W, Mo, Nb, Ta, and Re are considered to be useful, in particular.

For example, Japanese Patent Laid-Open No. 2005-251716 proposes a positive electrode active material for nonaqueous electrolyte secondary batteries having at least a lithium transition metal composite oxide with a layered structure, wherein the lithium transition metal composite oxide is present in the form of particles composed of either or both of primary particles and secondary particles as aggregates of the primary particles, and wherein the particles have a compound including at least one selected from the group consisting of molybdenum, vanadium, tungsten, boron, and fluorine at least on the surface thereof.

With that, it is claimed that the positive electrode active material for nonaqueous electrolyte secondary batteries having excellent battery characteristics even in more severe use environment is obtained, and that the initial characteristics are improved, without impairing the improvement in thermostability, load characteristics, and output characteristics, particularly by having the compound including at least one selected from the group consisting of molybdenum, vanadium, tungsten, boron, and fluorine on the surface of the particles.

However, the effect by adding the at least one element selected from the group consisting of molybdenum, vanadium, tungsten, boron, and fluorine is to improve the initial characteristics, that is, the initial discharge capacity and the initial efficiency, where the output characteristics are not mentioned. Further, according to the disclosed production method, the firing is performed while the additive element is mixed with a heat-treated hydroxide together with a lithium compound, and therefore the additive element is partially substituted with nickel disposed in layers to cause a reduction in battery characteristics, which has been a problem.

Further, Japanese Patent Laid-Open No. 2010-40383 proposes a positive electrode active material heat-treated while a tungstate compound is deposited on composite oxide particles mainly composed of lithium nickelate and having a carbonate ion content of 0.15 weight % or less.

According to this proposal, since the tungstate compound or a decomposition product of the tungstate compound is present on the surface of the positive electrode active material and the oxidation activity on the surface of the composite oxide particles during charge is suppressed, gas generation due to the decomposition of the nonaqueous electrolyte or the like can be suppressed, but there is no disclosure on the output characteristics.

Further, the disclosed production method is to deposit a solution in which a sulfuric acid compound, a nitric acid compound, a boric acid compound, or a phosphate compound serving as a deposition component is dissolved in a solvent together with the tungstate compound, on the composite oxide particles that are preferably heated to at least the boiling point of the solution in which the deposition component is dissolved, where the solvent is removed within a short time, and therefore the tungsten compound is not sufficiently dispersed on the surface of the composite oxide particles and is not uniformly deposited, which has been a problem.

Meanwhile, a proposal of improving output characteristics by forming fine particles containing lithium tungstate on the surface of the lithium-nickel composite oxide has been made.

For example, Japanese Patent Laid-Open No. 2013-125732 proposes a positive electrode active material for nonaqueous electrolyte secondary batteries having fine particles containing lithium tungstate represented by any one of $LiWO_4$, $Li_4WO_5$, and $Li_6W_2O_9$ on the surface of a lithium-nickel composite oxide composed of primary particles and secondary particles formed by aggregation of the primary particles.

Further, Japanese Patent Laid-Open No. 2013-152866 proposes a positive electrode active material for nonaqueous electrolyte secondary batteries having a layered or island-shaped lithium tungstate compound or hydrate thereof on the surface of the primary particles of the lithium-metal composite oxide.

High power is supposed to be obtained together with high capacity via any of these proposals. However, development of a positive electrode active material which allows further higher battery characteristics, including capacity and power enhancements, to be obtained is expected.

In view of such problems, it is an object of the present invention to provide a positive electrode active material for nonaqueous electrolyte secondary batteries which allows high power together with high capacity to be obtained when used as a positive electrode and shows excellent cycle characteristics.

SUMMARY

As a result of diligent studies on the powder characteristics of lithium-metal composite oxide used as a positive electrode active material for nonaqueous electrolyte secondary batteries and the effect thereof on the positive electrode resistance of the battery, for solving the aforementioned problems, the inventors have found that by forming a compound containing lithium and tungsten on the surface of primary particles constituting the lithium-metal composite oxide, and controlling the amount of tungsten contained in the compound to a specific amount, the characteristics when used as a positive electrode of batteries can be improved considerably, thereby accomplishing the present invention.

More specifically, the first aspect of the present invention is a positive electrode active material for nonaqueous electrolyte secondary batteries represented by the general formula (1): $Li_aNi_{1-x-y}Co_xM_yW_zO_{2+\alpha}$ (where $0 \leq x \leq 0.35$, $0 \leq y \leq 0.35$, $0.0008 \leq z \leq 0.030$, $0.97 \leq a \leq 1.25$, and $0 \leq \alpha \leq 0.20$ are satisfied, and M is at least one element selected from Mn, V, Mg, Mo, Nb, Ti, and Al) and constituted by a lithium-metal composite oxide composed of primary particles and secondary particles formed by aggregation of the primary particles, wherein a compound containing lithium and tungsten is formed on the surface of the primary particles of the lithium-metal composite oxide, and wherein the amount of tungsten contained in the compound is such that the number of atoms of W is 0.08 to 0.30 at % with respect to the total number of atoms of Ni, Co, and M contained in the positive electrode active material.

The second aspect of the present invention is the positive electrode active material for nonaqueous electrolyte secondary batteries according to the first aspect, wherein 50% or more of tungsten contained in the compound is present in a form of $Li_4WO_5$.

The third aspect of the present invention is the positive electrode active material for nonaqueous electrolyte secondary batteries according to the first and the second aspect, wherein the porosity measured in cross-sectional observation of the secondary particles is 0.15 to 3%.

The fourth aspect of the present invention is the positive electrode active material for nonaqueous electrolyte secondary batteries according to the first to third aspects, wherein the specific surface area measured by the BET method is 0.9 to 1.5 m²/g.

The fifth aspect of the present invention is the positive electrode active material for nonaqueous electrolyte secondary batteries according to the first to fourth aspects, wherein the compound is present on the surface of the primary particles of the lithium-metal composite oxide as fine particles having a particle size of 1 to 200 nm.

The sixth aspect of the present invention is the positive electrode active material for nonaqueous electrolyte secondary batteries according to the first to fourth aspects, wherein the compound is present on the surface of the primary particles of the lithium-metal composite oxide as coating films having a film thickness of 1 to 100 nm.

The seventh aspect of the present invention is the positive electrode active material for nonaqueous electrolyte secondary batteries according to the first to fourth aspects, wherein the compound is present on the surface of the primary particles of the lithium-metal composite oxide in both forms of fine particles having a particle size of 1 to 200 nm and coating films having a film thickness of 1 to 100 nm.

The eighth aspect of the present invention is the positive electrode active material for nonaqueous electrolyte secondary batteries according to any one of the first to seventh aspects, wherein the lithium-metal composite oxide is represented by the general formula (2): $Li_bNi_{1-x-y}Co_xM_yO_2$ (where $0 \leq x \leq 0.35$, $0 \leq y \leq 0.35$, and $0.95 \leq b \leq 1.20$ are satisfied, and M is at least one element selected from Mn, V, Mg, Mo, Nb, Ti, and Al).

The ninth aspect of the present invention is a nonaqueous electrolyte secondary battery having a positive electrode including the positive electrode active material for nonaqueous electrolyte secondary batteries obtained according to the first to eighth aspects.

According to the present invention, a positive electrode active material for nonaqueous electrolyte secondary batteries that allows high capacity and high power to be obtained, shows excellent cycle characteristics, and makes nonaqueous electrolyte secondary batteries with enhanced battery characteristics feasible when used as a positive electrode of batteries is obtained.

DETAILED DESCRIPTION

Figure 1:
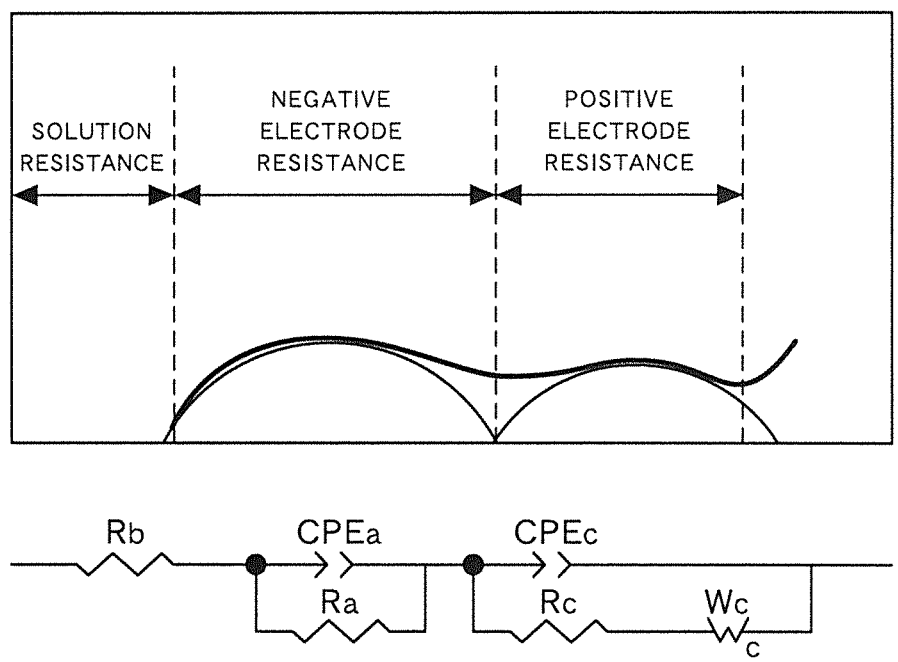
FIG. 1 is a schematic illustration of an equivalent circuit used for measurement examples of impedance evaluation and analysis.

Hereinafter, for the present invention, a positive electrode active material of the present invention will be first described, and thereafter a production method thereof and a nonaqueous electrolyte secondary battery using the positive electrode active material of the present invention will be described.

(1) Positive Electrode Active Material

The positive electrode active material for nonaqueous electrolyte secondary batteries of the present invention is represented by the general formula (1): $Li_aNi_{1-x-y}Co_xM_yW_zO_{2+\alpha}$ (where $0 \leq x \leq 0.35$, $0 \leq y \leq 0.35$, $0.0008 \leq z \leq 0.030$, $0.97 \leq a \leq 1.25$, and $0 \leq \alpha \leq 0.20$ are satisfied, and M is at least one element selected from Mn, V, Mg, Mo, Nb, Ti, and Al) and is constituted by a lithium-metal composite oxide composed of primary particles and secondary particles formed by aggregation of the primary particles, wherein a compound including lithium and tungsten is formed on the surface of the primary particles of the lithium-metal composite oxide, and wherein the amount of tungsten contained in the compound is such that the number of atoms of W is 0.08 to 0.30 at % with respect to the total number of atoms of Ni, Co, and M contained in the positive electrode active material.

More specifically, in the present invention, high charge-discharge capacity is ensured by using a lithium-metal composite oxide represented by the general formula (2): $Li_bNi_{1-x-y}Co_xM_yO_2$ (where $0 \leq x \leq 0.35$, $0 \leq y \leq 0.35$, and $0.95 \leq b \leq 1.20$ are satisfied, and M is at least one element selected from Mn, V, Mg, Mo, Nb, Ti, and Al) as a base material. Further, the base material is in the form of a lithium-metal composite oxide composed of primary particles and secondary particles formed by aggregation of the primary particles (hereinafter, the secondary particles and the primary particles existing alone may be referred to collectively as "lithium-metal composite oxide particles"), where a compound including lithium and tungsten is formed on the surface of the particles, thereby achieving high battery performance in battery capacity, output characteristics, and cycle characteristics.

Here, the composition ratio of Ni, Co, and M in the base material is maintained in the positive electrode active material, as well.

Preferably, the base material is a lithium-metal composite oxide represented by the general formula (3): $Li_b Ni_{1-x-y}Co_xM_yO_2$ (where M is at least one element selected from Mn, V, Mg, Mo, Nb, Ti, and Al. b, x, and y are numerical values satisfying the following conditions: $0.95 \leq b \leq 1.05$, $0 < x \leq 0.15$, $0 < y \leq 0.07$, and $x+y \leq 0.16$). Moreover, M in the formula is preferably Al, and in this case, y indicating the content of M is preferably $0.02 \leq y \leq 0.07$, and more preferably $0.035 \leq y \leq 0.06$.

Thereby, initial positive electrode resistance can be reduced, and low positive electrode resistance can be maintained even after the charge and discharge cycle.

Generally, when the surface of the positive electrode active material is completely coated with a different compound, the movement (intercalation) of lithium ions is significantly limited, and therefore high capacity that is an advantage of lithium nickel composite oxide is eventually offset.

In contrast, in the positive electrode active material for nonaqueous electrolyte secondary batteries of the present invention (which will be hereinafter referred to simply as "the positive electrode active material"), a compound including lithium (Li) and tungsten (W) (which may be hereinafter referred to simply as "the compound") is formed on the surface of the lithium-metal composite oxide particles, and the compound has high lithium ion conductivity and has an effect of promoting the movement of lithium ions. Therefore, the compound is formed on the surface of the lithium-metal composite oxide particles, thereby forming Li conduction paths at the interface with the electrolyte, so that the reaction resistance of the positive electrode active material (which may be hereinafter referred to as "positive electrode resistance") is reduced to improve the output characteristics.

Thus, the reduction in positive electrode resistance reduces the voltage to be lost in the battery, and the voltage actually applied to the load side is relatively increased, thereby allowing high power to be obtained. Further, the increase in the voltage applied to the load side allows lithium to be sufficiently inserted into and removed from the positive electrode, and therefore the battery capacity is also improved. Further, with the reduction in reaction resistance, the load on the active material during charging and discharging can also be reduced, thereby improving the cycle characteristics.

Thus, such a compound includes Li and W, thereby having high lithium ion conductivity and an effect of promoting the movement of lithium ions. It is preferable for 50% or more of W contained in the compound to be present in a form of $Li_4WO_5$.

More specifically, among compounds including Li and W, $Li_4WO_5$ has many Li ion conduction paths and a high effect of promoting the movement of Li ions; therefore, by making 50% or more of W present in the form of $Li_4WO_5$, even higher reduction effect for reaction resistance is obtained.

Here, the contact with the electrolyte occurs on the surface of the primary particles, and therefore it is important that the compound be formed on the surface of the primary particles.

The surface of the primary particles in the present invention include the surface of the primary particles exposed on the outer surface of the secondary particles, and the surface of the primary particles exposed into voids in the vicinity of the surface of the secondary particles and inside thereof communicating with the outside of the secondary particles so as to allow the electrolyte to penetrate therethrough. Further, the surface of the primary particles includes even the grain boundaries between the primary particles if the primary particles are not perfectly bonded, and the electrolyte can penetrate therethrough.

More specifically, the contact between the compound and the electrolyte occurs not only on the outer surface of the secondary particles constituted by aggregation of the primary particles but also in the voids in the vicinity of the surface of the secondary particles and inside thereof and further at the aforementioned imperfect grain boundaries, and therefore it is necessary to form the compound also on the surface of the primary particles to promote the movement of lithium ions.

Thus, the reaction resistance of the lithium-metal composite oxide particles can be further reduced by forming the compound on much of the surface of the primary particles which can contact with the electrolyte.

Here, the compound is not necessarily completely formed on the entire surface of the primary particles capable of contacting with the electrolyte, and may be partially coated or scattered. Even when partially coated or scattered, the effect of reducing the reaction resistance is obtained as long as the compound is formed on the surface of the primary particles capable of contacting with the electrolyte.

Meanwhile, the more the compound is formed, the more voids in the inside of the secondary particles or imperfect grain boundaries are blocked, and thus voids in the inside of the secondary particles or imperfection into which the electrolyte can penetrate decreases, leading to the reduction of the surface of the primary particles capable of contacting with the electrolyte.

Accordingly, it is necessary to control the amount of this compound to be formed to an amount sufficient to reduce the reaction resistance and to an amount that can sufficiently ensure the surface area of the primary particles capable of contacting with the electrolyte.

For this reason, the amount of this compound to be formed may be controlled through the amount of tungsten contained in the compound. The amount of tungsten contained in the compound is such that the number of atoms of W is 0.08 to 0.30 at %, preferably 0.10 to 0.30 at %, and more preferably 0.12 to 0.25 at % with respect to the total number of atoms of Ni, Co, and M contained in the positive electrode active material.

Thereby, while ensuring the surface area of the primary particles capable of contacting with the electrolyte, a sufficient amount of the compound is formed, and reaction resistance of the positive electrode active material may be reduced. In addition, the inside of the secondary particles may also contribute to charging and discharging efficiently, thereby improving the battery capacity as well.

Further, when the amount of tungsten is 0.12 to 0.25 at %, the battery capacity may be significantly improved with almost no increase in the positive electrode resistance through the charge and discharge cycle, whereas when the amount of tungsten contained in the compound is less than 0.08 at %, the amount of the compound to be formed is low and it is not possible to reduce the reaction resistance of the positive electrode active material.

Meanwhile, when the amount of tungsten exceeds 0.30 at %, the surface area of the primary particles capable of contacting with the electrolyte decreases and the charge and discharge efficiency in the inside of the secondary particles declines, thereby reducing the effect of improving the battery capacity.

In the positive electrode active material of the present invention, the porosity measured in cross-sectional observation of the secondary particles is preferably 0.15 to 3%, more preferably 0.15 to 1.5%, and even more preferably 0.15 to 0.5%. Thereby, it is possible for the electrolyte to penetrate into the inside of the secondary particles, and to sufficiently ensure the surface area of the primary particles capable of contacting with the electrolyte.

Moreover, it is also possible to control the surface of the primary particles capable of contacting with the electrolyte via the specific surface area. Preferably, the specific surface area of the positive electrode active material measured by the BET method is 0.9 to 1.5 $m^2/g$. Thus, by controlling the surface of the primary particles capable of contacting with the electrolyte into an appropriate surface area, enhanced battery characteristics may be obtained while ensuring the safety of the positive electrode active material.

Here, the porosity may be measured by observing an arbitrary cross section of the secondary particles using a scanning electron microscope and conducting image analysis.

The porosity can be determined by, for example, embedding a plurality of secondary particles into a resin or the like, processing the resulting embedded product by a cross section polishing process or the like so as to enable cross-sectional observation of the particles, and thereafter, selecting 20 or more arbitrary secondary particles, coloring void parts existing in the secondary particles black and coloring compact parts within the outline of the secondary particles white, measuring the total area of all of the measured secondary particles by means of an image analysis software: WinRoof 6.1.1 or the like, and calculating the area ratio of [black portions/(black portions+white portions)], which is defined as the porosity.

Further, in the case where the surface of the primary particles is coated with a layered material, the form of the compound on the surface of the primary particles makes the contact area with the electrolyte reduced. In addition, when the layered material is formed, the compound tends to be formed mainly on a particular surface of the primary particles. Accordingly, although the effects of improving the charge-discharge capacity and reducing the reaction resistance are obtained due to high lithium ion conductivity of the layered material serving as the coating material, there is room for improvement.

Accordingly, for obtaining a higher effect, the compound is preferably present on the surface of the primary particles of the lithium-metal composite oxide as fine particles having a particle size of 1 to 200 nm.

The contact area with the electrolyte is rendered sufficient by having such a form, so that the lithium ion conductivity can be effectively improved, thereby allowing the reaction resistance of the electrode to be more effectively reduced and the charge-discharge capacity to be improved. When the particle size is less than 1 nm, the fine particles may fail to have sufficient lithium ion conductivity in some cases.

However, if the particle size is over 200 nm, the formation of the fine particles on the surface may be non-uniform, resulting in failure to obtain a higher effect of reducing the reaction resistance.

However, not all of the compounds are necessarily present as fine particles having a particle size of 1 to 200 nm, and a high effect is obtained when 50% or more of the number of the fine particles formed on the surface of the primary particles are preferably formed to have a particle size in the range of 1 to 200 nm.

Meanwhile, when the surface of the primary particles is coated with a thin film, Li conduction paths can be formed at the interface with the electrolyte, while the reduction in specific surface area is suppressed, and higher effects of improving the charge-discharge capacity and reducing the reaction resistance are obtained. In the case where the surface of the primary particles are coated with the compound in the form of thin films as above, the compound is preferably present on the surface of the primary particles of the lithium-metal composite oxide as coating films with a film thickness of 1 to 100 nm.

When the film thickness is less than 1 nm, the coating films may fail to have sufficient lithium ion conductivity in some cases. Another reason is that when the film thickness is over 100 nm, the lithium ion conductivity is reduced, which may result in failure to obtain a higher effect compared to the effect of reducing the reaction resistance.

However, such coating film may be partially formed on the surface of the primary particles, and the whole coating film does not need to have a film thickness in the range of 1 to 100 nm. When the coating film with a film thickness of 1 to 100 nm is formed at least partially on the surface of the primary particles, a high effect is obtained. When the compound is formed as a coating film, by controlling the amount of tungsten contained in the compound to the range described above, a coating film is formed that has a film thickness of 1 to 100 nm, the amount of which is sufficient to obtain the effect.

Further, also in the case where a compound is formed on the surface of the primary particles is the form of fine particles as well as in the form of a coating thin film, a high effect on the battery characteristics is obtained.

Meanwhile, in the case where fine particles are non-uniformly formed between the lithium-metal composite oxide particles, the movement of lithium ions between the lithium-metal composite oxide particles is rendered non-uniform, and therefore a load is applied onto some specific lithium-metal composite oxide particles, which tends to cause a deterioration in cycle characteristics and an increase in reaction resistance.

Accordingly, fine particles are preferably uniformly formed also between the lithium-metal composite oxide particles.

Such properties of the surface of the lithium-metal composite oxide particles can be determined, for example, by observation using a field emission scanning electron microscope, and it has been confirmed that in the positive electrode active material of the present invention, the compound including W and Li is formed in the form previously mentioned on the surface of the lithium-metal composite oxide particles.

The positive electrode active material of the present invention has battery characteristics improved by forming the compound including W and Li on the surface of the primary particles constituting the lithium-metal composite oxide to reduce the reaction resistance, and the powder characteristics as the positive electrode active material such as particle size and tap density need only to fall within the range of commonly used positive electrode active materials.

Furthermore, in the entire positive electrode active material, the Li content in the compound including Li and W is increased compared to the lithium content contained in the lithium-metal composite oxide.

Accordingly, for the amount of lithium in the entire positive electrode active material, the atomic ratio "Li/Me1" of the number of atoms of Li with respect to the sum ($Me^1$) of the number of atoms of Ni, Co, and M in the positive electrode active material is 0.97 to 1.25, and preferably 0.97 to 1.20. When the ratio "Li/Me$^1$" is less than 0.97, the reaction resistance of the positive electrode in the nonaqueous electrolyte secondary battery using the obtained positive electrode active material increases, and thus the output of the battery decreases. Further, when the ratio "Li/Me$^1$" is over 1.25, the discharge capacity of the positive electrode active material decreases, and the reaction resistance of the positive electrode increases as well. In order to reduce the reaction resistance and raise the discharge capacity to further improve battery characteristics, it is more preferable for the ratio "Li/Me$^1$" to be 0.97 to 1.20.

In addition, the atomic ratio "Li/Me$^1$" of the number of atoms of Li with respect to the sum ($Me^2$) of the number of atoms of Ni, Co, and M in the lithium-metal composite oxide is preferably 0.95 to 1.20, and more preferably 0.97 to 1.15.

By setting the ratio "Li/Me$^2$" to be 0.95 to 1.20, the ratio "Li/Me$^1$" can be readily controlled within the range of 0.97 to 1.25.

The effect by providing the compound including W and L on the surface of the primary particles of the lithium-metal composite oxide particles in the form described above is applicable not only to the positive electrode active material described in the present invention, but also to, for example, lithium-metal composite oxide such as lithium-cobalt composite oxide, lithium-manganese composite oxide and lithium-nickel-cobalt-manganese composite oxide, as well as commonly used positive electrode active materials for lithium secondary batteries.

(2) Method for Producing Positive Electrode Active Material

Hereinafter, a method for producing the positive electrode active material of the present invention will be described in detail for each step, but the method is not limited as long as the positive electrode active material described above is obtained.

A. Mixing Step

The mixing step is a step of adding a tungsten compound to the lithium-metal composite oxide particles composed of primary particles and secondary particles constituted by aggregation of the primary particles and mixing them together.

The lithium-metal composite oxide particles need only to be composed of primary particles and secondary particles constituted by aggregation of the primary particles, and may be obtained by using a known technique. For example, by mixing and baking a nickel composite hydroxide that is obtained by co-precipitating a metal element constituting the lithium-metal composite oxide, or a nickel composite oxide that is obtained by further heat treating the nickel composite hydroxide, with a lithium compound, the lithium-nickel composite oxide particles may be obtained.

In addition, the lithium-metal composite oxide particles are used as a base material for the positive electrode active material to be obtained, and their composition is, like the base material, adjusted to the general formula (2): $Li_b Ni_{1-x-y}Co_xM_yO_2$ (where $0 \leq x \leq 0.35$, $0 \leq y \leq 0.35$, and $0.95 \leq b \leq 1.20$ are satisfied, and M is at least one element selected from Mn, V, Mg, Mo, Nb, and Al).

Further, in order to make the porosity and specific surface area of the positive electrode active material within the preferred range as describe above, it is more preferable for the lithium-nickel composite oxide particles used as the base material to have a measured porosity of 0.2 to 3.5%, and more preferably of 0.15 to 2%, and even more preferably of 0.15 to 0.8%, like the positive electrode active material. In addition, it is preferable to use the lithium-nickel composite oxide particles having a specific surface area of 1.0 to 2.0 m$^2$/g.

The porosity and specific surface area can be controlled through baking conditions in mixing and baking the lithium compound. Moreover, in the lithium-nickel composite oxide particles, there are some cases where the porosity and specific surface area do not show their true values because of excess lithium present on the surface of primary particles; therefore, it is preferable to make a measurement after water washing a measurement sample of the lithium-nickel composite oxide particles that are used for the mixing step, as describe below.

Methods for adding a tungsten compound include a method of adding an alkaline solution in which a tungsten compound is dissolved (which will be hereinafter referred to as alkaline solution (W)) to the lithium-metal composite oxide particles and mixing them together. Alternatively, a method of adding powder of a tungsten compound to the lithium-metal composite oxide particles in the state where water is contained and mixing them together may also be used.

Through these methods, the tungsten compound may penetrate into the lithium-metal composite oxide particles as the alkaline solution (W) or by dissolving in the water contained in the lithium-metal composite oxide, thus resulting in the dispersion of W onto the surface of the primary particles of the lithium-metal composite oxide powder capable of contacting with the electrolyte.

In methods of mixing the alkaline solution (W) or powder of the tungsten compound, the addition amount of tungsten in the mixing step coincides with the content of tungsten in the obtained positive electrode active material. As such, the addition amount of tungsten in the mixing step is adjusted such that the number of atoms of W is 0.08 to 0.30 at %, preferably 0.1 to 0.25 at % with respect to the total number of atoms of Ni, Co, and M contained in the lithium-metal composite oxide. Thus, excess elution of Li from the lithium-metal composite oxide particles may be suppressed, and formation of $Li_4WO_5$, which has a high effect of prompting the movement of Li ions, may be promoted.

Hereinafter, methods of mixing the alkaline solution (W) or powder of the tungsten compound will be described in detail by way of specific examples.

A-1. Method of Mixing with Alkaline Solution (W)

First, the tungsten compound is dissolved into an alkaline solution. A method of dissolving the tungsten compound may be a normal dissolving method for powder, and for example, the tungsten compound may be added and dissolved into a solution while stirring the solution using a reaction vessel equipped with a stirring device. In terms of uniformity of dispersion, it is preferable for the tungsten compound to be completely dissolved in the alkaline solution.

Tungsten compounds to be added need only to be dissolvable in the alkaline solution, and it is preferable to use tungsten compounds that are readily alkaline-soluble, such as tungsten oxide, lithium tungstate, and ammonium tungstate.

The amount of alkaline solution (W) to be mixed with the lithium-metal composite oxide particles is 0.5 to 150 ml, preferably 2 to 150 ml, more preferably 3 to 100 ml, and even more preferably 5 to 60 ml with respect to 100 g of the lithium-metal composite oxide particles, and a liquid volume where the tungsten compound can be mixed via stirring or the like may be used.

When the amount of alkaline solution (W) is less than 0.5 ml with respect to 100 g of the lithium-metal composite oxide powder, the alkaline solution is too little to uniformly disperse W on the surface of the primary particles described above. On the other hand, when the amount of alkaline solution (W) exceeds 150 ml, the alkaline solution is too much and it is slurried upon mixing with the lithium-metal composite oxide particles. Because of this slurrying, Li contained in the layer lattice of the lithium-metal composite oxide tends to be eluted, thus leading to the reduction in battery characteristics.

In addition, solid-liquid separation for facilitating drying makes control of the amount of tungsten in the positive electrode active material complicated since the amount of tungsten added as the alkaline solution (W) does not coincide with the amount of tungsten in the positive electrode active material. By setting the alkaline solution (W) to be 0.5 to 150 ml with respect to 100 g of the lithium-metal composite oxide particles, the elution of Li contained in the layer lattice described above can be suppressed, and W may be uniformly dispersed onto the surface of the primary particles described above.

In addition, the concentration of tungsten in the alkaline solution (W) is preferably 0.05 to 2 mol/L. When the concentration is less than 0.05 mol/L, the concentration of tungsten is low and a large amount of the alkaline solution to be mixed is required; therefore, the elution of Li via the slurrying described above may occur, which is not preferable. On the other hand, when the concentration of tungsten exceeds 2 mol/L, the amount of the alkaline solution becomes less; therefore, W cannot be sometimes uniformly dispersed on the surface of the primary particles.

As alkali used for the alkaline solution, in order to obtain high charge-discharge capacity, general alkaline solutions that do not contain any detrimental impurities for the positive electrode active material are used.

Ammonia or lithium hydroxide that has no risk of impurity contamination may be used, but in terms of not inhibiting the intercalation of Li, it is preferable to use lithium hydroxide.

The amount of lithium contained in the positive electrode active material after mixing needs to fall within the range of the ratio "Li/Me$^1$" of the general formula (1), but it is preferable to set the amount of Li in the alkaline solution (W) to be 2.5 to 4.0 with respect to the amount of W based on the atomic ratio.

Li is eluted and supplied from the lithium-metal composite oxide as well, but by adding lithium hydroxide for the amount of Li to be in this range, a sufficient amount of Li can be supplied to form a compound including lithium and tungsten, preferably lithium tungstate, and more preferably $Li_4WO_5$.

In addition, it is preferred that the alkali solution is an aqueous solution.

In order to disperse W on the entire surface of the primary particles, it is required that W penetrates into the voids inside the secondary particles as well as incomplete grain boundaries. When a solvent such as an alcohol having a high volatility is used, there are some cases where the alkaline solution do not penetrate into the voids inside the secondary particles sufficiently because the solvent evaporates before the alkaline solution penetrates.

The pH of the alkaline solution needs only to be a pH where the tungsten compound dissolves, but preferably it is 9 to 12. When the pH is less than 9, there is a risk for battery characteristics to deteriorate because the amount of lithium eluted from the lithium-metal composite oxide becomes too high. In addition, when the pH exceeds 12, there is a risk for battery characteristics to deteriorate because the excess amount of alkali remains in the lithium-metal composite oxide.

Next, the prepared alkaline solution (W) is added to and mixed with the lithium-metal composite oxide particles while stirring.

This mixing is preferably conducted under the condition where the alkaline solution (W) is liquid and the temperature is 50° C. or less.

The alkaline solution (W) needs to penetrate into the voids of the secondary particles as well as grain boundaries, and therefore, it is necessary for the solution to be liquid. In addition, if the temperature is above 50° C., a solvent evaporates rapidly from the alkaline solution and there is a risk for the solution not to penetrate into the voids of the secondary particles and grain boundaries.

Moreover, if the evaporation is too rapid, the elution of Li from the lithium-metal composite oxide powder cannot be expected. Particularly, when the alkaline solution (W) does not contain Li, there are some cases where Li is not contained in fine particles formed on the surface.

The lithium-metal composite oxide powder and the alkaline solution (W) are sufficiently mixed in order to uniformly disperse W. For this mixing, general mixers may be used.

For example, the lithium-metal composite oxide powder may be mixed with the alkaline solution (W) sufficiently to an extent such that the shape of the powder is not broken, using a shaker mixer, a Loedige mixer, a Julia mixer, a V blender, or the like. As such, W in the alkaline solution (W) may be uniformly distributed onto the surface of the primary particles of the lithium-metal composite oxide.

In a method for producing the positive electrode active material of the present invention, the lithium-metal composite oxide particles, which are the base material, may be further water washed before the mixing step in order to improve the battery capacity and safety of the positive electrode active material.

This water washing may be performed by a known method and under known conditions, and it may be performed to an extent such that lithium is not eluted from the lithium-metal composite oxide particles in an excess amount to deteriorate battery characteristics.

When water washing is performed, it is preferable to mix with the alkaline solution (W) after solid-liquid separation only without drying. When mixing with the alkaline solution (W) is conducted after drying, the elution of Li may increase, thereby deteriorating the battery characteristics.

When only solid-liquid separation is performed, the concentration of tungsten in the alkaline solution (W) is adjusted such that the concentration of tungsten calculated by adding the water content included in the lithium-metal composite oxide particles to the alkaline solution (W) is not less than 0.05 mol/L.

When the concentration of tungsten declines, the amount of lithium eluted from the lithium-metal composite oxide may become excessive, deteriorating the battery characteristics.

A-2. Method of Mixing with Powder of Tungsten Compound

This is a method in which a washed cake obtained by the water washing is mixed with powder of a tungsten compound to obtain a tungsten-containing mixture with the lithium-nickel composite oxide particles constituting the washed cake (which will be hereinafter referred to simply as "the mixture").

This water washing may be performed by the same known method and under the same conditions as in "A-1. Method of mixing with alkaline solution (W)."

The tungsten compound used for the mixing should be water-soluble so as to be dissolved in the water contained in the mixture, in order to penetrate into the surface of the primary particles inside the secondary particles.

Further, the water in the mixture becomes alkaline due to the elution of lithium, and therefore the tungsten compound may be a compound soluble in alkaline water.

Further, the mixture is heated in the subsequent heat-treating step, and therefore, even if the tungsten compound is difficult to be dissolved in water at room temperature, it needs only to be dissolved in water by heating in the heat treatment or by forming lithium tungstate through the reaction with the lithium compound on the surface of the lithium-nickel composite oxide particles.

Further, the dissolved tungsten compound needs only to be in an amount that allows the penetration to the surface of the primary particles inside the secondary particles, and therefore the tungsten compound may be partially solid after the mixing or after the heating.

In this way, the tungsten compound needs only to be soluble in water when heated in the heat-treating step, and tungsten oxide, tungstic acid, ammonium tungstate, sodium tungstate, lithium tungstate, or the like is preferable, and tungsten oxide ($WO_3$) or tungstic acid monohydrate ($WO_3.H_2O$) in which there is low risk of impurity contamination is more preferable.

Further, the washed cake is preferably mixed with the tungsten compound at a temperature of 50° C. or less.

If the temperature is over 50° C., the resulting mixture may not have a water content necessary for promoting the reaction between the lithium compound and the tungsten compound because a water may be evaporated during the mixing.

For mixing the washed cake of the lithium-nickel composite oxide and the tungsten compound powder, a common mixer can be used. For example, the mixing may be performed sufficiently to an extent such that the shape of the lithium-nickel composite oxide particles is not broken, using a shaker mixer, a Loedige mixer, a Julia mixer, a V blender, or the like.

[Drying Step]

The drying step is a step where the lithium-metal composite oxide particles in which W has been dispersed in the mixing step are dried.

Through this drying treatment, a compound including W and Li is formed from W supplied from the tungsten compound and Li dissolved in water in the post-mixing lithium-metal composite oxide particles, and a positive electrode active material for nonaqueous electrolyte secondary batteries having the compound including W and Li on the surface of the primary particles of the lithium-metal composite oxide is thus obtained.

The drying method is not particularly limited, but it is preferable that heat treatment is performed at a temperature of 100 to 250° C. under an oxygen atmosphere or vacuum atmosphere in order to prevent deterioration of the battery characteristics when used as a positive electrode active material for nonaqueous electrolyte secondary batteries.

When the drying temperature is below 100° C., water evaporation is insufficient and sometimes the compound may not be sufficiently formed. On the other hand, when the drying temperature exceeds 250° C., the drying becomes time-consuming, and also is not suitable to be conducted on an industrial scale since the production apparatus becomes large scale.

The drying is preferably performed under an oxidizing atmosphere such as an oxygen atmosphere or a vacuum atmosphere, for avoiding the reaction with water or carbonic acid in the atmosphere.

The drying time is not particularly limited, but 0.5 hour or more at the highest temperature reached during the drying is preferable since the compound is formed by sufficiently evaporating water in the lithium-metal composite oxide particles.

In addition, if the temperature is raised while water remains in the lithium-metal composite oxide powder, Li is eluted therefrom in an excess amount; therefore, when the water content is 1% or more, it is desirable that the temperature does not exceed 100° C.

(3) Nonaqueous Electrolyte Secondary Battery

The nonaqueous electrolyte secondary battery of the present invention is constituted by a positive electrode, a negative electrode, a nonaqueous electrolyte, etc., and constituted by the same components as those of common nonaqueous electrolyte secondary batteries. The embodiment described below is just an example, and the nonaqueous electrolyte secondary battery of the present invention can be implemented by employing embodiments in which various changes and improvements are made, using the embodiment shown in this description as a base, based on the knowledge of those skilled in the art. Further, the applications of the nonaqueous electrolyte secondary battery of the present invention are not specifically limited.

(a) Positive Electrode

Using the positive electrode active material for nonaqueous electrolyte secondary batteries described above, the positive electrode of the nonaqueous electrolyte secondary battery is produced, for example, as follows.

First, a positive electrode active material in powder form, a conductive material serving as a conductive additive, and a binder are mixed, and activated carbon and a solvent for its intended purpose such as a viscosity adjuster are further added, as needed, and the mixture is kneaded to produce a positive electrode composite material paste.

The mixing ratio of each component in the positive electrode composite material paste is also an important element to determine the performance of the nonaqueous electrolyte secondary battery. When the total mass of the solid contents of the positive electrode composite material excluding the solvent is taken as 100 parts by mass, it is preferable that the content of the positive electrode active material be 60 to 95 parts by mass, the content of the conductive material be 1 to 20 parts by mass, and the content of the binder be 1 to 20 parts by mass, as in a positive electrode of a common nonaqueous electrolyte secondary battery.

The obtained positive electrode composite material paste, for example, is applied to the surface of a current collector made of aluminum foil, followed by drying, to disperse the solvent. In order to enhance the electrode density, it may be pressed by roll pressing or the like, as needed. Thus, a positive electrode in sheet form can be produced. The positive electrode in sheet form can be used for producing a battery, for example, by being cut into a suitable size corresponding to the intended battery. However, the method for producing the positive electrode is not limited to the aforementioned example, and another method may be employed.

For producing the positive electrode, graphite (such as natural graphite, artificial graphite, and expanded graphite) and carbon black materials such as acetylene black and Ketjen black (R), for example, can be used as the conductive material serving as a conductive additive.

The binder serves to hold the active material particles, for which polyvinylidene fluoride (PVDF), polytetrafluoroethylene (PTFE), fluororubber, ethylene propylene diene rubber, styrene butadiene, cellulose resins, and polyacrylic acid, for example, can be used.

As needed, the positive electrode active material, the conductive material serving as a conductive additive, and the activated carbon are dispersed, and a solvent to dissolve the binder is added to the positive electrode composite material. Specifically, an organic solvent such as N-methyl-2-pyrrolidone may be used as the solvent.

Further, activated carbon may be added to the positive electrode composite material for increasing the capacity of the electric double layer.

(b) Negative Electrode

As the negative electrode, used is a material which is formed by applying a negative electrode composite material formed into a paste by mixing the binder with metal lithium, lithium alloy, or the like, or a negative electrode active material capable of absorbing and desorbing lithium ions and adding a suitable solvent, onto the surface of the current collector made of a metal foil such as copper, followed by drying and compressing for increasing the electrode density, as needed.

As the negative electrode active material, for example, a powder material of natural graphite, artificial graphite, a fired material of an organic compound such as a phenolic resin, and a carbon material such as cokes may be used.

In this case, a fluorine-containing resin such as PVDF may be used as the negative electrode binder, as in the positive electrode, and an organic solvent such as N-methyl-2-pyrrolidone may be used as the solvent to disperse the active material and the binder therein.

(c) Separator

A separator is interposed between the positive electrode and the negative electrode. The separator separates the positive electrode and the negative electrode from each other and holds the electrolyte. A thin film of polyethylene, polypropylene, or the like having a large number of fine holes can be used as the separator.

(d) Non-Aqueous Electrolyte

The nonaqueous electrolyte is formed by dissolving a lithium salt as a supporting salt in an organic solvent.

As the organic solvent, one selected from cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butanesulton, and phosphorus compounds such as triethyl phosphate and trioctyl phosphate may be used alone, or two or more of these may be mixed for use.

As the supporting salt, $LiPF_6$, $LiBF_4$, $LiClO_4$, $LiAsF_6$, and $LiN(CF_3SO_2)_2$, and composite salts of these may be used.

Further, the non-aqueous electrolyte may contain a radical scavenger, a surfactant, a flame retardant, and the like.

(e) Shape and Configuration of Battery

The nonaqueous electrolyte secondary battery of the present invention constituted by the positive electrode, the negative electrode, the separator, and the non-aqueous electrolyte described as above can have various shapes such as a cylindrical type and a stacked type.

Even if any shape is employed, an electrode body is obtained by stacking the positive electrode and the negative electrode via the separator, the obtained electrode body is impregnated with the non-aqueous electrolyte, the connection between the positive electrode current collector and the positive electrode terminal connected to the outside and the connection between the negative electrode current collector and the negative electrode terminal connected to the outside are established using leads for the current collectors, and the components are sealed in a battery case, to complete the nonaqueous electrolyte secondary battery.

(f) Characteristics

The nonaqueous electrolyte secondary battery using the positive electrode active material of the present invention has high capacity and high power.

In particular, the nonaqueous electrolyte secondary battery obtained by a further preferable embodiment using the positive electrode active material according to the present invention, for example, when used as a positive electrode of a 2032-type coin battery, has a high initial discharge capacity of 165 mAh/g or more and a low positive electrode resistance and further has high capacity and high power. Further, it also has high thermostability and excellent safety.

The method for measuring the positive electrode resistance in the present invention is exemplified, as follows.

When the frequency dependence of a battery reaction is measured by a common AC impedance method as an electrochemical evaluation technique, a Nyquist diagram based on the solution resistance, the negative electrode resistance and the negative electrode capacity, and the positive electrode resistance and the positive electrode capacity is obtained as shown in FIG. 1.

The battery reaction in an electrode is made by the resistance components following charge transfers and the capacity components by an electric double layer. When these components are shown as an electrical circuit, a parallel circuit of the resistance and the capacity is obtained, and they are shown as an equivalent circuit in which the solution resistance and the parallel circuit of the negative electrode and the positive electrode are connected in series as the entire battery.

The Nyquist diagram determined is subjected to fitting calculation using the equivalent circuit, and the resistance components and the capacity components each can be estimated. The positive electrode resistance is equal to the diameter of a semicircle on the low frequency side of the Nyquist diagram to be obtained.

From above, the positive electrode resistance can be estimated by performing the AC impedance measurement on the produced positive electrode and subjecting the obtained Nyquist diagram to fitting calculation using the equivalent circuit.

EXAMPLES

Hereinafter, the present invention will be further described by way of examples.

For a secondary battery having a positive electrode using the positive electrode active material obtained by the present invention, the performance (such as initial discharge capacity, positive electrode resistance and cycle characteristics) was measured.

Hereinafter, the present invention will be specifically described by way of examples, but the present invention is not limited to these examples at all.

(Production and Evaluation of Battery)

For evaluating the positive electrode active material, a 2032-type coin battery 1 (which will be hereinafter referred to as "coin type battery") shown in FIG. 2 was used.

Figure 2:
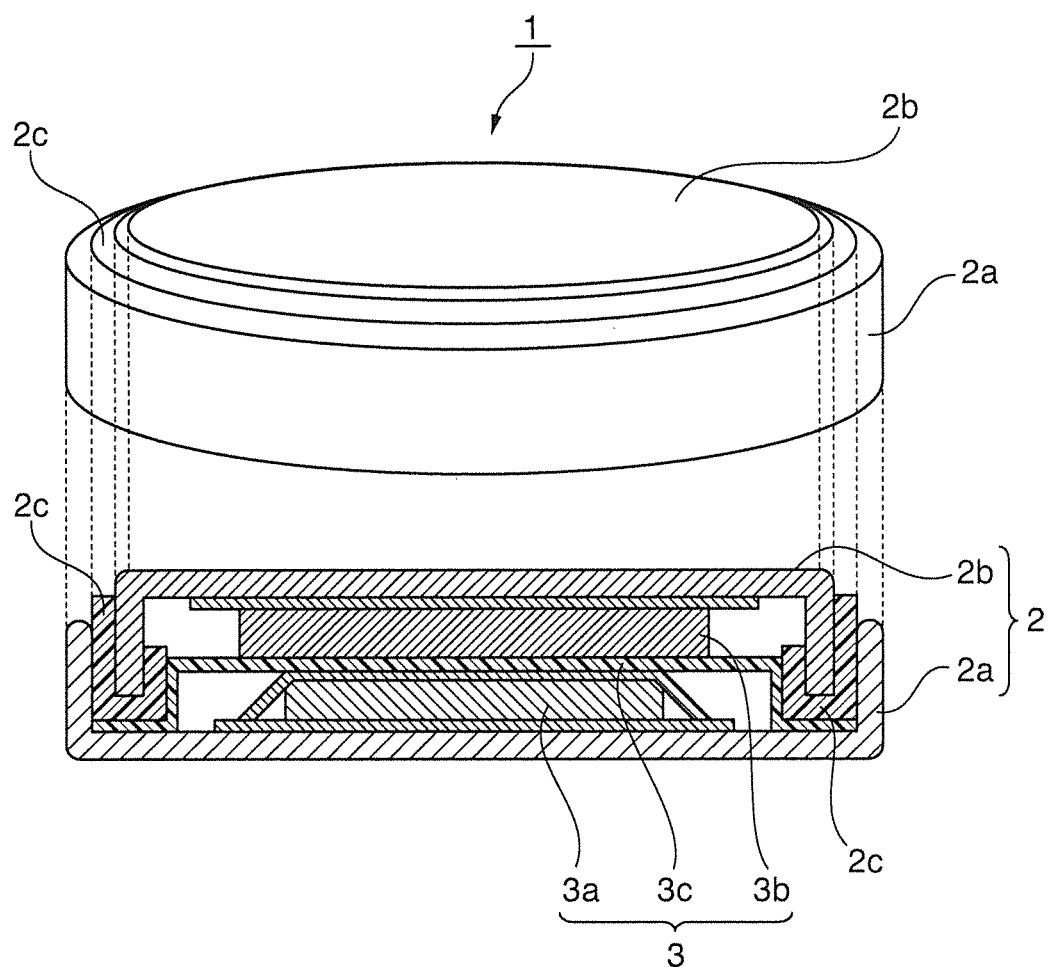
FIG. 2 is a schematic sectional view of a coin battery 1 used for battery evaluation.

As shown in FIG. 2, the coin type battery 1 is constituted by a case 2 and electrodes 3 housed in the case 2.

The case 2 has a hollow positive electrode can 2a with one end open and a negative electrode can 2b arranged in the opening of the positive electrode can 2a, and is configured so that, when the negative electrode can 2b is arranged in the opening of the positive electrode can 2a, a space to house the electrodes 3 is formed between the negative electrode can 2b and the positive electrode can 2a.

The electrodes 3 are constituted by a positive electrode 3a, a separator 3c, and a negative electrode 3b, which are stacked to be aligned in this order and are housed in the case 2 so that the positive electrode 3a is in contact with the inner surface of the positive electrode can 2a, and the negative electrode 3b is in contact with the inner surface of the negative electrode can 2b.

The case 2 includes a gasket 2c, and the relative movement between the positive electrode can 2a and the negative electrode can 2b is fixed by the gasket 2c so that the non-contact state is maintained. Further, the gasket 2c also has a function of sealing the gap between the positive electrode can 2a and the negative electrode can 2b so as to block between the inside and the outside of the case 2 air-tightly and liquid-tightly.

The coin type battery 1 shown in FIG. 2 was fabricated as follows.

First, 52.5 mg of the positive electrode active material for nonaqueous electrolyte secondary batteries, mg of acetylene black, and 7.5 mg of polytetrafluoroethylene resin (PTFE) were mixed, followed by press molding at a pressure of 100 MPa to a diameter of 11 mm and a thickness of 100 μm, to produce the positive electrode 3a. The thus produced positive electrode 3a was dried in a vacuum dryer at 120° C. for 12 hours.

Using the positive electrode 3a, the negative electrode 3b, the separator 3c, and the electrolyte, the coin type battery 1 described above was produced in a glove box under Ar atmosphere with the dew point controlled to −80° C.

As the negative electrode 3b, a negative electrode sheet in which graphite powder with an average particle size of about 20 μm and polyvinylidene fluoride were applied to a copper foil and which was punched into a disk shape with a diameter of 14 mm was used. As the separator 3c, a polyethylene porous film with a film thickness of 25 μm was used. As the electrolyte, an equal mixture (manufactured by TOMIYAMA PURE CHEMICAL INDUSTRIES, LTD.) of ethylene carbonate (EC) and diethyl carbonate (DEC) with 1 M LiClO$_4$ serving as a supporting electrolyte was used.

The initial discharge capacity and the positive electrode resistance showing the performance of the thus produced coin type battery 1 were evaluated as follows.

The capacity when the coin type battery 1 allowed to stand for about 24 hours from the fabrication was charged, with the current density with respect to the positive electrode set to 0.1 mA/cm$^2$, to a cut-off voltage of 4.3 V after the OCV (Open Circuit Voltage) became stable, followed by a pause for one hour, and was discharged to a cut-off voltage of 3.0 V was taken as the initial discharge capacity.

Further, the Nyquist plot shown in FIG. 1 is obtained by charging the coin type battery 1 at a charge potential of 4.1 V and measuring the initial positive electrode resistance using a frequency response analyzer and a potentio-galvanostat (1255B, manufactured by Solartron) by the AC impedance method. Since the Nyquist plot is shown as the sum of characteristic curves showing the solution resistance, the negative electrode resistance and the capacity thereof, and the positive electrode resistance and the capacity thereof, fitting calculation was performed based on the Nyquist plot using the equivalent circuit to calculate the value of the positive electrode resistance.

The cycle characteristics were evaluated based on positive electrode resistance after a cycle test.

The cycle test was performed by measuring the initial discharge capacity, followed by a 10-minute pause, and thereafter repeating the charge and discharge cycle, in the same manner as in the measurement of the initial discharge capacity, 500 times (charge and discharge) including the measurement of the initial discharge capacity.

The positive electrode resistance after the 500 cycles was measured in the evaluation.

The positive electrode resistance and the positive electrode resistance after the cycle test were evaluated as relative values, based on the initial positive electrode resistance of Example 1 and the positive electrode resistance after the cycle test as 100, respectively.

In the present examples, the positive electrode active material, and the secondary battery, the respective samples of special reagents manufactured by Wako Pure Chemical Industries, Ltd. were used for producing the composite hydroxide.

Example 1

As a base material, lithium-nickel composite oxide particles represented by Li$_{1.025}$Ni$_{0.91}$Co$_{0.06}$Al$_{0.03}$O$_2$ and obtained by a known technique of mixing an oxide containing Ni as a main component and lithium hydroxide followed by firing were used. It was confirmed by scanning electron microscopy (SEM) that the obtained lithium-nickel composite oxide particles were composed of secondary particles formed by aggregation of primary particles and a small amount of primary particles that were independent without aggregation. The average value of these lithium-metal composite oxide particles via volumetric integration in the laser diffraction scattering method was 10.6 μm.

150 mL of pure water at 25° C. was added to 150 g of the base material to form a slurry, followed by washing with water for 15 minutes. After the washing with water, solid-liquid separation was performed by filtration using a Buchner funnel. The washed cake had a water content of 7.8%.

Next, 0.54 g of tungsten oxide (WO$_3$) was added to the washed cake so that the amount of W was 0.15 at % with respect to the total number of atoms of Ni, Co, and Al contained in the lithium-nickel composite oxide, and the mixture was sufficiently mixed using a shaker mixer (TURBULA TypeT2C, manufactured by Willy A. Bachofen AG) to obtain a mixed powder. The obtained mixed powder was placed into a SUS container, statically dried by heating to 100° C. for 12 hours and to 190° C. for 10 hours using a vacuum dryer, and thereafter cooled in a furnace.

Finally, a sieve with a mesh opening of 38 μm was applied for deagglomeration, to obtain a positive electrode active material having fine particles of lithium tungstate on the surface of the primary particles.

The composition of the obtained positive electrode active material was analyzed by the ICP method, and it was confirmed that the molar ratio of Li:Ni:Co:Al was 0.990: 0.910:0.060:0.030, and that the tungsten content was 0.15 at % with respect to the total number of atoms of Ni, Co, and Al.

In addition, the specific surface area of the obtained positive electrode active material via the BET method was 1.16 m$^2$/g.

[Morphological Analysis of a Compound Including Lithium and Tungsten]

The obtained positive electrode active material was embedded into a resin, and cross-section polishing was performed thereon to produce a sample. The cross section of the sample was observed by SEM at 5000-fold magnification, and it was confirmed that the sample was composed of primary particles and secondary particles constituted by aggregation of the primary particles and that fine particles of a compound including lithium and tungsten were formed on the surface of the primary particles. The particle size of the fine particles was 20 to 120 nm. In addition, it was confirmed that the porosity of the secondary particles via the image analysis described above, as determined through this observation was 0.32%.

Further, the vicinity of the surface of the primary particles of the obtained positive electrode active material was observed by a transmission electron microscope (TEM), and it was confirmed that coating of the compound including lithium and tungsten with a film thickness of 1 to 70 nm was formed on the surface of the primary particles and that the compound was lithium tungstate.

The present state of lithium tungstate in the positive electrode active material was evaluated by titrating Li eluted from the positive electrode active material.

As a result of evaluating the compound state of lithium eluted from the neutralization point appearing by adding pure water to the obtained positive electrode active material, followed by stirring for a certain time, and thereafter adding hydrochloric acid while measuring the pH of the filtrate after filtration, it was confirmed that Li$_4$WO$_5$ and Li$_2$WO$_4$ were present in lithium tungstate, and the abundance ratio of the contained Li$_4$WO$_5$ was calculated to be 87 mol %.

[Evaluation of Battery]

The battery characteristics of the coin type battery 1 shown in FIG. 2 having a positive electrode produced using the obtained positive electrode active material were evaluated. The initial discharge capacity was 215 mAh/g.

Hereinafter, for Examples and Comparative Examples, only materials and conditions changed from those in Example 1 described above are shown. In addition, evaluation values of initial discharge capacity and positive electrode resistance for these examples and comparative examples are shown in Table 1 and Table 2.

Example 2

A positive electrode active material was obtained and was evaluated in the same manner as in Example 1 except that 0.36 g of tungsten oxide (WO$_3$) was added to the washed cake so that the amount of W was 0.10 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990: 0.910:0.060:0.030, and that the tungsten content was 0.10 at % with respect to the total number of atoms of Ni, Co, and Al.

The cross-sectional observation by SEM was conducted, and it was confirmed that fine particles with a particle size of 20 to 120 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 1 to 70 nm was formed on the surface of the primary particles and that the compound was lithium tungstate. Table 1 and Table 2 summarize and show the evaluation results.

Example 3

A positive electrode active material was obtained and was evaluated in the same manner as in Example 1 except that 0.72 g of tungsten oxide (WO$_3$) was added to the washed cake so that the amount of W was 0.20 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990: 0.910:0.060:0.030, and that the tungsten content was 0.20 at % with respect to the total number of atoms of Ni, Co, and Al.

The cross-sectional observation by SEM was conducted, and it was confirmed that fine particles with a particle size of 30 to 150 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 1 to 80 nm was formed on the surface of the primary particles and that the compound was lithium tungstate.

Table 1 and Table 2 summarize and show the evaluation results.

Example 4

A positive electrode active material was obtained and was evaluated in the same manner as in Example 1 except that 0.90 g of tungsten oxide (WO$_3$) was added to the washed cake so that the amount of W was 0.25 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990: 0.910:0.060:0.030, and that the tungsten content was 0.25 at % with respect to the total number of atoms of Ni, Co, and Al.

The cross-sectional observation by SEM was conducted, and it was confirmed that fine particles with a particle size of 30 to 150 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 1 to 80 nm was formed on the surface of the primary particles and that the compound was lithium tungstate.

Table 1 and Table 2 summarize and show the evaluation results.

Example 5

A positive electrode active material was obtained and was evaluated in the same manner as in Example 1 except that lithium-nickel composite oxide particles represented by $Li_{1.025}Ni_{0.910}Co_{0.045}Al_{0.045}O_2$ were used as a base material.

The composition of the obtained positive electrode active material was analyzed by the ICP method, and it was confirmed that the molar ratio of Li:Ni:Co:Al was 0.990:0.910:0.045:0.045, and that the tungsten content was 0.15 at % with respect to the total number of atoms of Ni, Co, and Al.

The cross-sectional observation by SEM was conducted, and it was confirmed that fine particles with a particle size of 20 to 120 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 1 to 70 nm was formed on the surface of the primary particles and that the compound was lithium tungstate. Table 1 and Table 2 summarize and show the evaluation results.

Example 6

A positive electrode active material was obtained and was evaluated in the same manner as in Example 5 except that 0.36 g of tungsten oxide ($WO_3$) was added to the washed cake so that the amount of W was 0.10 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990:0.910:0.045:0.045, and that the tungsten content was 0.09 at % with respect to the total number of atoms of Ni, Co, and Al.

The cross-sectional observation by SEM was conducted, and it was confirmed that fine particles with a particle size of 20 to 120 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 1 to 70 nm was formed on the surface of the primary particles and that the compound was lithium tungstate. Table 1 and Table 2 summarize and show the evaluation results.

Example 7

A positive electrode active material was obtained and was evaluated in the same manner as in Example 5 except that 0.72 g of tungsten oxide ($WO_3$) was added to the washed cake so that the amount of W was 0.10 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990:0.910:0.045:0.045, and that the tungsten content was 0.21 at % with respect to the total number of atoms of Ni, Co, and Al.

The cross-sectional observation by SEM was conducted, and it was confirmed that fine particles with a particle size of 30 to 150 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 1 to 80 nm was formed on the surface of the primary particles and that the compound was lithium tungstate. Table 1 and Table 2 summarize and show the evaluation results.

Example 8

A positive electrode active material was obtained and was evaluated in the same manner as in Example 5 except that 0.90 g of tungsten oxide ($WO_3$) was added to the washed cake so that the amount of W was 0.10 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990:0.910:0.045:0.045, and that the tungsten content was 0.25 at % with respect to the total number of atoms of Ni, Co, and Al.

The cross-sectional observation by SEM was conducted, and it was confirmed that fine particles with a particle size of 30 to 150 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 1 to 80 nm was formed on the surface of the primary particles and that the compound was lithium tungstate. Table 1 and Table 2 summarize and show the evaluation results.

Comparative Example 1

A positive electrode active material was obtained and was evaluated in the same manner as in Example 1 except that tungsten oxide was not added to the washed cake and the washed cake was dried as it was.

The composition of the obtained positive electrode active material was analyzed by the ICP method, and it was confirmed that the molar ratio of Li:Ni:Co:Al was 0.990:0.910:0.060:0.030.

In addition, the specific surface area and porosity of the positive electrode active material obtained in Comparative Example 1, which correspond to the specific surface area and porosity of the base material, were 1.40 $m^2$/g and 0.42%, respectively.

Table 1 and Table 2 summarize and show the evaluation results.

Comparative Example 2

A positive electrode active material was obtained and was evaluated in the same manner as in Example 1 except that 0.18 g of tungsten oxide ($WO_3$) was added to the washed cake so that the amount of W was 0.05 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990:0.910:0.060:0.003, and that the tungsten content was 0.05 at % with respect to the total number of atoms of Ni, Co, and Al.

The cross-sectional observation by SEM was conducted, and a compound including lithium and tungsten was not confirmed on the surface of the primary particles. Further, the vicinity of the surface of the primary particles of the obtained positive electrode active material was observed by a transmission electron microscope (TEM), and it was confirmed that coating of the compound including lithium and tungsten with a film thickness of 1 to 60 nm was formed on the surface of the primary particles and that the compound was lithium tungstate.

Table 1 and Table 2 summarize and show the evaluation results.

Comparative Example 3

A positive electrode active material was obtained and was evaluated in the same manner as in Example 1 except that 1.80 g of tungsten oxide ($WO_3$) was added to the washed cake so that the amount of W was 0.50 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990:0.910:0.060:0.030, and that the tungsten content was 0.50 at % with respect to the total number of atoms of Ni, Co, and Al.

The cross-sectional observation by SEM was conducted, and it was confirmed that fine particles with a particle size of 30 to 250 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 2 to 120 nm was formed on the surface of the primary particles and that the compound was lithium tungstate.

Table 1 and Table 2 summarize and show the evaluation results.

Comparative Example 4

A positive electrode active material was obtained and was evaluated in the same manner as in Example 1 except that 3.60 g of tungsten oxide ($WO_3$) was added to the washed cake so that the amount of W was 1.00 at with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990:0.910:0.060:0.030, and that the tungsten content was 1.00 at % with respect to the total number of atoms of Ni, Co, and Al.

The cross-sectional observation by SEM was conducted, and it was confirmed that fine particles with a particle size of 30 to 250 nm of a compound including lithium and tungsten were formed on the surface of the primary particles. Further, the vicinity of the surface of the primary particles of the obtained positive electrode active material was observed by a transmission electron microscope (TEM), and it was confirmed that coating of the compound including lithium and tungsten with a film thickness of 2 to 120 nm was formed on the surface of the primary particles and that the compound was lithium tungstate.

Table 1 and Table 2 summarize and show the evaluation results.

Comparative Example 5

A positive electrode active material was obtained and was evaluated in the same manner as in Example 5 except that tungsten oxide was not added to the washed cake and the washed cake was dried as it was.

The composition of the obtained positive electrode active material was analyzed by the ICP method, and it was confirmed that the molar ratio of Li:Ni:Co:Al was 0.990:0.910:0.045:0.045.

In addition, the specific surface area and porosity of the positive electrode active material obtained in Comparative Example 5, which correspond to the specific surface area and porosity of the base material, were 1.43 $m^2$/g and 0.43%, respectively.

Table 1 and Table 2 summarize and show the evaluation results.

Comparative Example 6

A positive electrode active material was obtained and was evaluated in the same manner as in Example 5 except that 0.18 g of tungsten oxide ($WO_3$) was added to the washed cake so that the amount of W was 0.05 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990:0.910:0.045:0.045, and that the tungsten content was 0.06 at % with respect to the total number of atoms of Ni, Co, and Al.

The cross-sectional observation by SEM was conducted, and a compound including lithium and tungsten was not confirmed on the surface of the primary particles. Further, the vicinity of the surface of the primary particles of the obtained positive electrode active material was observed by a transmission electron microscope (TEM), and it was confirmed that coating of the compound including lithium and tungsten with a film thickness of 1 to 60 nm was formed on the surface of the primary particles and that the compound was lithium tungstate.

Table 1 and Table 2 summarize and show the evaluation results.

Comparative Example 7

A positive electrode active material was obtained and was evaluated in the same manner as in Example 5 except that 1.80 g of tungsten oxide ($WO_3$) was added to the washed cake so that the amount of W was 0.50 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990: 0.910:0.045:0.045, and that the tungsten content was 0.50 at % with respect to the total number of atoms of Ni, Co, and Al.

The cross-sectional observation by SEM was conducted, and it was confirmed that fine particles with a particle size of 30 to 250 nm of a compound including lithium and tungsten were formed on the surface of the primary particles.

Further, the vicinity of the surface of the primary particles of the obtained positive electrode active material was observed by a transmission electron microscope (TEM), and it was confirmed that coating of the compound including lithium and tungsten with a film thickness of 2 to 120 nm was formed on the surface of the primary particles and that the compound was lithium tungstate.

Table 1 and Table 2 summarize and show the evaluation results.

Comparative Example 8

A positive electrode active material was obtained and was evaluated in the same manner as in Example 5 except that 3.60 g of tungsten oxide ($WO_3$) was added to the washed cake so that the amount of W was 1.00 at % with respect to the total number of atoms of Ni, Co, and Al contained in the lithium-nickel composite oxide.

The composition of the obtained positive electrode active material was analyzed by the ICP method, and it was confirmed that the molar ratio of Li:Ni:Co:Al was 0.990: 0.910:0.045:0.045, and that the tungsten content was 0.99 at % with respect to the total number of atoms of Ni, Co, and Al.

The cross-sectional observation by SEM was conducted, and it was confirmed that fine particles with a particle size of 30 to 250 nm of a compound including lithium and tungsten were formed on the surface of the primary particles. Further, the vicinity of the surface of the primary particles of the obtained positive electrode active material was observed by a transmission electron microscope (TEM), and it was confirmed that coating of the compound including lithium and tungsten with a film thickness of 2 to 120 nm was formed on the surface of the primary particles and that the compound was lithium tungstate.

Table 1 and Table 2 summarize and show the evaluation results.

TABLE 1

| | Composition of positive electrode active material [molar ratio] | | | | W/Ni + Co + Al [at %] | Specific surface area [m²/g] | Porosity [%] |
|---|---|---|---|---|---|---|---|
| | Li | Ni | Co | Al | | | |
| Example 1 | 0.990 | 0.910 | 0.060 | 0.030 | 0.15 | 1.16 | 0.32 |
| Example 2 | 0.990 | 0.910 | 0.060 | 0.030 | 0.10 | 1.21 | 0.30 |
| Example 3 | 0.990 | 0.910 | 0.060 | 0.030 | 0.20 | 1.09 | 0.28 |
| Example 4 | 0.990 | 0.910 | 0.060 | 0.030 | 0.25 | 1.05 | 0.22 |
| Example 5 | 0.990 | 0.910 | 0.045 | 0.045 | 0.15 | 1.17 | 0.31 |
| Example 6 | 0.990 | 0.910 | 0.045 | 0.045 | 0.09 | 1.24 | 0.31 |
| Example 7 | 0.990 | 0.910 | 0.045 | 0.045 | 0.21 | 1.08 | 0.27 |
| Example 8 | 0.990 | 0.910 | 0.045 | 0.045 | 0.25 | 1.02 | 0.18 |
| Comparative Example 1 | 0.990 | 0.910 | 0.060 | 0.030 | 0.00 | 1.40 | 0.42 |
| Comparative Example 2 | 0.990 | 0.910 | 0.060 | 0.030 | 0.05 | 1.28 | 0.20 |
| Comparative Example 3 | 0.990 | 0.910 | 0.060 | 0.030 | 0.50 | 0.84 | 0.13 |
| Comparative Example 4 | 0.990 | 0.910 | 0.060 | 0.030 | 1.00 | 0.55 | 0.05 |
| Comparative Example 5 | 0.990 | 0.910 | 0.045 | 0.045 | 0.00 | 1.43 | 0.43 |
| Comparative Example 6 | 0.990 | 0.910 | 0.045 | 0.045 | 0.06 | 1.28 | 0.24 |
| Comparative Example 7 | 0.990 | 0.910 | 0.045 | 0.045 | 0.50 | 0.95 | 0.15 |
| Comparative Example 8 | 0.990 | 0.910 | 0.045 | 0.045 | 0.99 | 0.70 | 0.06 |

TABLE 2

| | Compound on surface of primary particles | | | | Battery performance | | |
|---|---|---|---|---|---|---|---|
| | Form | Particle size [nm] | Film thickness [nm] | Component composition | Abundance ratio of $Li_4WO_5$ [mol %] | Initial discharge capacity [mAh/g] | Positive electrode resistance | Positive electrode resistance after cycles |
| Example 1 | Thin film | 20-120 | 1-70 | $Li_4WO_5$ + $Li_2WO_4$ | 87 | 215.0 | 100 | 100 |
| Example 2 | Thin film | 20-120 | 1-70 | $Li_4WO_5$ + $Li_2WO_4$ | 98 | 215.8 | 102 | 188 |

TABLE 2-continued

|  | Compound on surface of primary particles | | | | Battery performance | | |
|---|---|---|---|---|---|---|---|
|  | Form | Particle size [nm] | Film thickness [nm] | Component composition | Abundance ratio of $Li_4WO_5$ [mol %] | Initial discharge capacity [mAh/g] | Positive electrode resistance | Positive electrode resistance after cycles |
| Example 3 | Fine particles + Thin film | 30-150 | 1-80 | $Li_4WO_5 + Li_2WO_4$ | 88 | 214.8 | 98 | 95 |
| Example 4 | Fine particles + Thin film | 30-150 | 1-80 | $Li_4WO_5 + Li_2WO_4$ | 50 | 213.3 | 102 | 101 |
| Example 5 | Thin film | 20-120 | 1-70 | $Li_4WO_5 + Li_2WO_4$ | 89 | 215.3 | 95 | 98 |
| Example 6 | Thin film | 20-120 | 1-70 | $Li_4WO_5 + Li_2WO_4$ | 98 | 215.7 | 98 | 142 |
| Example 7 | Fine particles + Thin film | 30-150 | 1-80 | $Li_4WO_5 + Li_2WO_4$ | 77 | 214.9 | 92 | 94 |
| Example 8 | Fine particles + Thin film | 30-150 | 1-80 | $Li_4WO_5 + Li_2WO_4$ | 62 | 214.2 | 96 | 95 |
| Comparative Example 1 | — | — | — | — | — | 204.0 | 171 | 727 |
| Comparative Example 2 | Thin film | — | 1-60 | $Li_4WO_5 + Li_2WO_4$ | 99 | 212.3 | 115 | 323 |
| Comparative Example 3 | Fine particles + Thin film | 30-250 | 2-120 | $Li_4WO_5 + Li_2WO_4$ | 29 | 207.1 | 88 | 82 |
| Comparative Example 4 | Fine particles + Thin film | 30-250 | 2-120 | $Li_4WO_5 + Li_2WO_4$ | 24 | 198.0 | 81 | 79 |
| Comparative Example 5 | — | — | — | — | — | 205.2 | 159 | 617 |
| Comparative Example 6 | Thin film | — | 1-60 | $Li_4WO_5 + Li_2WO_4$ | 97 | 209.2 | 111 | 314 |
| Comparative Example 7 | Fine particles + Thin film | 30-250 | 2-120 | $Li_4WO_5 + Li_2WO_4$ | 31 | 205.1 | 82 | 80 |
| Comparative Example 8 | Fine particles + Thin film | 30-250 | 2-120 | $Li_4WO_5 + Li_2WO_4$ | 25 | 199.6 | 77 | 76 |

[Evaluation]

As is obvious from Table 1 and Table 2, the positive electrode active materials of Examples 1 to 8 were produced according to the present invention and therefore had higher initial discharge capacity as well as lower initial and post-cycle test positive electrode resistance, as compared with Comparative Examples, and they formed batteries having excellent characteristics.

Particularly, the positive electrode active materials of Examples 5 to 8 where the proportion of Al was raised such that the molar ratio of Li:Ni:Co:Al was 0.990:0.910:0.045:0.045 had even lower initial and post-cycle test positive electrode resistance, as compared with the positive electrode active materials of Examples 1 to 4, and they formed batteries having more excellent characteristics.

Figure 3:
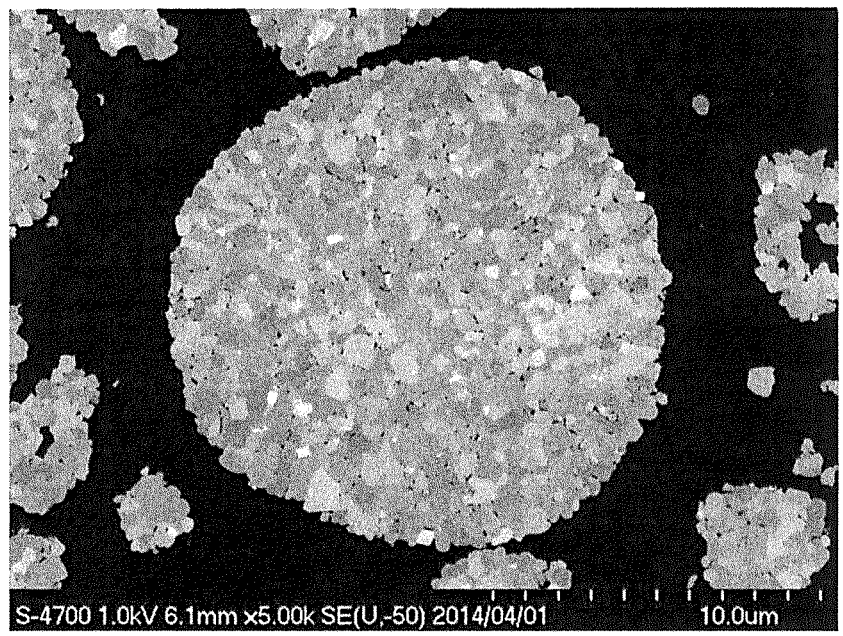
FIG. 3 is a cross-sectional SEM image (observed at 10000-fold magnification) of a lithium-metal composite oxide of the present invention.

Further, FIG. 3 shows an example of the results of the cross-sectional SEM observation of the positive electrode active materials obtained in Examples of the present invention, where it was confirmed that such a positive electrode active material thus obtained was composed of primary particles and secondary particles formed by aggregation of the primary particles, that voids were present in the inside of the secondary particles, and that fine particles of lithium tungstate were formed on the surface of the primary particles.

In contrast to Examples as described above, in Comparative Examples 1 and 5, since fine particles of lithium tungstate according to the present invention were not formed on the surface of the primary particles, the positive electrode resistance was considerably high, and thus it is difficult to satisfy the requirements of power enhancement.

In Comparative Examples 2 and 6, since addition amounts of tungsten were low, formation of a compound including lithium and tungsten was less, resulting in higher positive electrode resistance.

In Comparative Examples 3, 4, 7, and 8, it is believed that since addition amounts of tungsten were high, Li was excessively extracted from the lithium-nickel composite oxide when a compound including lithium and tungsten was formed. In addition, because of the reduction in the specific surface area and porosity, the battery capacity is also reduced.

INDUSTRIAL APPLICABILITY

The nonaqueous electrolyte secondary battery of the present invention is suitable for power sources of small portable electronic devices (such as laptop personal computers and mobile phone terminals) that constantly require high capacity and is suitable for batteries for electric cars that require high power.

Further, the nonaqueous electrolyte secondary battery of the present invention has excellent safety and allows size reduction and power enhancement, and therefore it is suitable as a power source for electric cars where there is a restriction on the mounting space. The present invention can be used not only as a power source for electric cars which are purely driven by electric energy but also as a power source for so-called hybrid vehicles that is used in combination with a combustion engine such as a gasoline engine and a diesel engine.

REFERENCE SIGNS LIST

1: Coin type battery
2: Case
2a: Positive electrode can
2b: Negative electrode can
2c: Gasket
3: Electrode
3a: Positive electrode
3b: Negative electrode
3c: Separator

The invention claimed is:

1. A positive electrode active material for nonaqueous electrolyte secondary batteries, the positive electrode active material having a compound containing lithium and tungsten on a surface of primary particles of a lithium-metal composite oxide that is represented by a general formula (3): $Li_bNi_{1-x-y}Co_xM_yO_2$ (where $0<x\leq0.15$, $0<y\leq0.07$, $x+y\leq0.16$, and $0.95\leq b\leq1.05$ are satisfied and M is at least one element selected from Mn, V, Mg, Mo, Nb, Ti, or Al) and composed of the primary particles and secondary particles formed by aggregation of the primary particles, wherein a specific surface area of the lithium-metal composite oxide measured by a BET method is 1.0 to 2.0 $m^2/g$ and a porosity measured in cross-sectional observation of the secondary particles is 0.2 to 3.5%, wherein:
  a porosity measured in cross-sectional observation of the positive electrode active material is 0.15 to 3% and a specific surface area of the positive electrode active material measured by the BET method is 0.9 to 1.5 $m^2/g$,
  an amount of tungsten contained in the compound is such that a number of atoms of W is 0.08 to 0.30 at % with respect to a total number of atoms of Ni, Co, and M contained in the positive electrode active material,
  50% or more of tungsten contained in the compound is present in a form of $Li_4WO_5$, and
  the compound is present on the surface of the primary particles of the lithium-metal composite oxide as fine particles having a particle size of 1 to 200 nm and a coating film having a film thickness of 1 to 100 nm.

2. A nonaqueous electrolyte secondary battery comprising:
  a positive electrode comprising the positive electrode active material for nonaqueous electrolyte secondary batteries according to claim 1.

3. The positive electrode active material for nonaqueous electrolyte secondary batteries according to claim 1, wherein a composition ratio of Ni, Co and M in the lithium metal composite oxide is the same as a composition ratio of Ni, Co and M in the positive electrode active material.

4. A positive electrode active material for nonaqueous electrolyte secondary batteries, the positive electrode active material having a compound containing lithium and tungsten on a surface of primary particles of a lithium-metal composite oxide that is represented by a general formula (3): $Li_bNi_{1-x-y}Co_xM_yO_2$ (where $0<x\leq0.15$, $0<y\leq0.07$, $x+y\leq0.16$, and $0.95\leq b\leq1.05$ are satisfied and M is at least one element selected from Mn, V, Mg, Mo, Nb, Ti, or Al) and composed of the primary particles and secondary particles formed by aggregation of the primary particles, wherein a specific surface area of the lithium-metal composite oxide measured by a BET method is 1.0 to 2.0 $m^2/g$ and a porosity measured in cross-sectional observation of the secondary particles is 0.2 to 3.5%, wherein:
  a porosity measured in cross-sectional observation of the positive electrode active material is 0.15 to 3% and a specific surface area of the positive electrode active material measured by the BET method is 0.9 to 1.5 $m^2/g$,
  an amount of tungsten contained in the compound is such that a number of atoms of W is 0.08 to 0.30 at % with respect to a total number of atoms of Ni, Co, and M contained in the positive electrode active material,
  50% or more of tungsten contained in the compound is present in a form of $Li_4WO_5$, and:
  the compound is present on the surface of the primary particles of the lithium-metal composite oxide as fine particles having a particle size of 1 to 200 nm.

5. A nonaqueous electrolyte secondary battery comprising:
  a positive electrode comprising the positive electrode active material for nonaqueous electrolyte secondary batteries according to claim 4.

6. A positive electrode active material for nonaqueous electrolyte secondary batteries, the positive electrode active material having a compound containing lithium and tungsten on a surface of primary particles of a lithium-metal composite oxide that is represented by a general formula (3): $Li_bNi_{1-x-y}Co_xM_yO_2$ (where $0<x\leq0.15$, $0<y\leq0.07$, $x+y\leq0.16$, and $0.95\leq b\leq1.05$ are satisfied and M is at least one element selected from Mn, V, Mg, Mo, Nb, Ti, or Al) and composed of the primary particles and secondary particles formed by aggregation of the primary particles, wherein a specific surface area of the lithium-metal composite oxide measured by a BET method is 1.0 to 2.0 $m^2/g$ and a porosity measured in cross-sectional observation of the secondary particles is 0.2 to 3.5%, wherein:
  a porosity measured in cross-sectional observation of the positive electrode active material is 0.15 to 3% and a specific surface area of the positive electrode active material measured by the BET method is 0.9 to 1.5 $m^2/g$,
  an amount of tungsten contained in the compound is such that a number of atoms of W is 0.08 to 0.30 at % with respect to a total number of atoms of Ni, Co, and M contained in the positive electrode active material,
  50% or more of tungsten contained in the compound is present in a form of $Li_4WO_5$, and
  the compound is present on the surface of the primary particles of the lithium-metal composite oxide as a coating film having a film thickness of 1 to 100 nm.

7. A nonaqueous electrolyte secondary battery comprising:
  a positive electrode comprising the positive electrode active material for nonaqueous electrolyte secondary batteries according to claim 6.

* * * * *